United States Patent [19]

Meier et al.

[11] Patent Number: 5,755,421
[45] Date of Patent: May 26, 1998

[54] GUIDE RAIL ARRANGEMENT FOR A VEHICLE SEAT

[75] Inventors: Johann Meier, Fensterbach/Wolfring; Paul Haril, Kümmersbruck, both of Germany

[73] Assignee: Grammer AG, Amberg, Germany

[21] Appl. No.: 700,752

[22] Filed: Jul. 30, 1996

[30] Foreign Application Priority Data

Aug. 17, 1995 [DE] Germany .................. 195 30 266.4

[51] Int. Cl.$^6$ .................................................. F16M 13/00
[52] U.S. Cl. ............................................................ 248/429
[58] Field of Search ........................... 248/429, 430, 248/424; 296/65.1

[56] References Cited

U.S. PATENT DOCUMENTS 5,529,397  6/1996  Yoshida .................... 248/430

FOREIGN PATENT DOCUMENTS 37726    10/1981  European Pat. Off. ........ 248/430 UX
524053   11/1994  European Pat. Off. .
2820151   2/1986  Germany .

Primary Examiner—Ramon O. Ramirez
Attorney, Agent, or Firm—Elliot M. Olstein; Raymond J. Lillie

[57] ABSTRACT

A guide rail arrangement for a vehicle seat has first and second rail members. The first and second rail members are of configurations which engage one into the other to hold the rail members slidably together and they have first and second contact portions, along which the rail members bear linearly against each other for mutual play-free guidance thereof.

1 Claim, 1 Drawing Sheet

GUIDE RAIL ARRANGEMENT FOR A VEHICLE SEAT

FIELD OF THE INVENTION

The invention concerns a guide rail arrangement for a vehicle seat and a vehicle seat including such a guide rail arrangement.

BACKGROUND OF THE INVENTION

A guide rail arrangement for a vehicle seat is known from DE 28 20 151 C2, comprising first and second rail members of which one is fixed to the seat which is to be slidably guided by the guide rail arrangement, and the other is fixed to a surface such as a vehicle floor on which the seat is to be supported. Balls or rollers are provided between the first and second rail members. It will be appreciated however that arranging the balls or rollers between the two rail members involves a not inconsiderable manufacturing expenditure and complexity.

In another guide rail arrangement for a vehicle seat, as is to be found in EP 0 524 053 B1, the guide rail arrangement comprises first and second rail members, the first rail member being a substantially U-shaped member defined by a base portion and first and second limb portions each having an outwardly oriented inverted U-shaped edge profile. The second rail member is an inverted U-shaped profile defined by a base portion and first and second limb portions which embrace the inverted edge profile configurations of the first rail member. Each limb portion of the second rail member has a U-shaped edge profile configuration and each inverted U-shaped edge profile configuration of the first rail member and the associated edge profile configuration of the second rail member respectively engage into each other. Arranged between the first and second rail members are balls so that in terms of manufacture and assembly, this arrangement suffers from the same difficulties and problems as the above-discussed guide rail arrangement of DE 28 20 151 C2. The guide arrangement of EP 0 524 30 053 B1 is also provided with profile elements which form damping means. Fitting those profile elements also represents a not inconsiderable amount of assembly work and thus increases the cost of the arrangement.

SUMMARY OF THE INVENTION

An object of the present invention is to provide a guide rail arrangement for a vehicle seat, which involves a comparatively low level of manufacturing expenditure without that adversely affecting the adjustability properties or the strength properties of the guide rail arrangement.

Another object of the present invention is to provide a vehicle seat guide rail arrangement which can be inexpensively assembled from inexpensively manufacturable components while still affording good adjustment sliding qualities for the seat on which the guide rail arrangement is used.

Still a further object of the present invention is to provide a guide rail arrangement for a vehicle seat which can be inexpensively produced and assembled without inherently by virtue of its design involving play between the various movable components of the arrangement.

Yet another object of the present invention is to provide a vehicle seat including a guide rail arrangement which provides for ready adjustment of the vehicle seat in accordance with the wishes of the occupant without inherently involving slack in the assembly components.

In accordance with the principles of the present invention the foregoing and other objects are attained by a guide rail arrangement for a vehicle seat comprising first and second rail members, wherein the first rail member comprises a substantially U-shaped profile defined by a base portion and first and second limb portions which each have an outwardly oriented inverted U-shaped edge profile configuration. The second rail member comprises an inverted substantially U-shaped profile defined by a base portion and first and second limb portions embracing the inverted U-shaped edge profile configurations of the first rail member. Each limb portion of the second rail member has a respective substantially U-shaped edge profile configuration and each inverted U-shaped edge profile configuration of the first rail member and the associated U-shaped edge profile configuration of the second rail member respectively engage into each other. The first and second rail members are provided with contact portions, along which the rail members bear linearly against each other for mutual play-free guidance. First contact portions are provided between the respective limb portion of the first rail member and the associated U-shaped edge profile configuration of the second rail member and second contact portions are provided between the respective inverted U-shaped edge profile configuration of the first rail member and the base portion of the second rail member. The respective contact portions are defined by curvature portions which extend in the longitudinal direction of the respective rail members and which are respectively formed on the limb portions and on the inverted U-shaped edge profile configurations of the first rail member.

As will be seen in detail from a preferred embodiment of the invention described hereinafter, the configuration of the vehicle seat guide rail arrangement according to the invention advantageously makes it possible to compensate in a simple manner for dimensional tolerances in terms of the cross-sectional profile of the first and/or second rail members. In addition, the multiple linear contact between the first and second rail members affords the advantage of relatively low-friction linear guidance for the rail members relative to each other. Vehicle seats fitted with a guide rail arrangement according to the invention are therefore displaceable and adjustable in their longitudinal direction, by the application of a low level of force. In accordance with the invention moreover strength in a vertical direction and thus the crash-situation characteristics of the guide rail arrangement according to the invention are also very good.

It will also be noted that because the guide rail arrangement according to the invention provides that the two first contact portions are between the respective limb portions of the first rail member and the associated U-shaped edge profile configurations of the second rail member and the two second contact portions are between the respective inverted U-shaped edge portion of the first rail member and the base portion of the second rail member, the first contact portions provide a play-free guidance means in the transverse direction of the guide rail arrangement. The two second contact portions carry the weight loading on the respective guide rail arrangement.

As noted the contact portions can be defined by curves or curvature portions extending in the longitudinal direction of the rail members and can be formed in the first rail member. The curvature portions are preferably formed on the limb portions and on the inverted U-shaped edge profile configurations of the first rail member.

Further objects, features and advantages of the present invention will be apparent from the following description of a preferred embodiment.

BRIEF DESCRIPTION OF THE DRAWING

The single FIGURE of the drawing is a diagrammatic cross-sectional view on an enlarged scale of an embodiment of the vehicle seat guide rail arrangement according to the invention.

DESCRIPTION OF A PREFERRED EMBODIMENT

Figure 1:
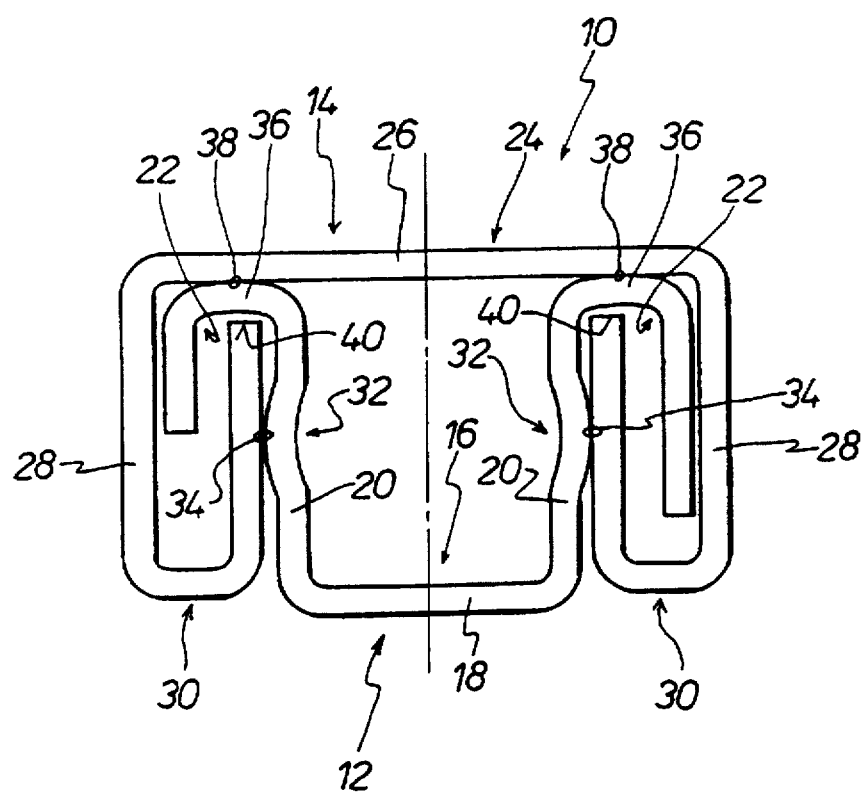

Referring now to the drawing, shown therein is an embodiment of the guide rail arrangement according to the invention as generally indicated at 10, comprising a first elongate rail member 12 and a second elongate rail member 14. The first rail member 12 has means for mounting it to a support for the seat such as a vehicle floor, while the second rail member 14 will be mounted in use to the seat on which the guide rail arrangement is to be employed.

The first rail member 12 comprises a U-shaped profile 16 defined by a base portion 18 and first and second limb portions 20 which project upwardly from the base portion 18, in the mounted position as shown in the drawing. Each of the two limb portions 20 has an outwardly oriented, inverted substantially U-shaped edge profile configuration as indicated at 22. The free end of the outside limb of each of the inverted U-shaped edge profile configurations 22 thus faces downwardly in the drawing.

The second rail member has an inverted substantially U-shaped edge profile configuration 24 defined by a base portion 26 and first and second limb portions 28. The two limb portions 28 embrace the inverted U-shaped edge profile configurations of the first rail member 12. The two limb portions 28 of the second rail member 14 have inverted substantially U-shaped edge profile configurations as indicated at 30 and are so dimensioned that the U-shaped edge profile configurations 30 of the second rail member and the inverted U-shaped edge profile configurations 22 of the first rail member 12 engage one into the other, as can be clearly seen from the drawing.

The two limb portions 20 of the first rail member 12 are each provided with an outwardly curved curvature portion 32, which are oriented in the longitudinal direction of the first rail member 12. A first, virtually linear contact portion 34 is thus provided between the first and second rail members 12 and 14 by each of the two curvature portions 32. Those two first contact portions 34 provide for at least substantially play-free guidance in the transverse direction of the guide rail arrangement 10 as between the first and second rail members 12 and 14.

In addition, at each of its two inverted U-shaped edge profile configurations 22 the first rail member 12 has a respective curvature portion as indicated at 36. Each curvature portion 36 is thus provided in the base portion of the respective U-shaped configuration of the edge profile configuration 22. Each of those two curvature portions 36 provides a respective second virtually linear contact portion 38 between the first and second rail members 12 and 14 of the guide rail arrangement 10. The second contact portions 38 thus provide a similar freedom from play in the vertical direction of the guide rail arrangement 10.

In the event of a crash situation occurring, corresponding contact occurs between the two curvature portions 36 of the first rail member 12 and the inside edges as indicated at 40 of the U-shaped edge profile configurations 30 of the second rail member 14, while the interengagement of the U-shaped configurations of the first and second rail members 12 and 14 provides what is effectively hooking interengagement between the two rail members 12 and 14.

It will be appreciated that the above-described construction in accordance with the principles of the present invention has been set forth solely by way of example and illustration of the invention and that various modifications and alterations may be made therein without thereby departing from the spirit and scope of the invention.

What is claimed is:

1. A guide rail device for a vehicle seat, said guide rail device comprising a first rail part (12) and a second rail part (14), wherein said first rail part (12) has a U profile (16) and includes a base part (18) and two shank parts (20), each of which is adjacent to an outwardly directed reverse U edge profile (22), and wherein said second rail part (14) has a reverse U profile (24) and includes a base part (26) and two shank parts (28), which surround said two reverse U edge profiles (22) of said first rail part (12), where the shank part (28) of said second rail part (14), in each instance, is formed with a U shaped edge profile (30), and the reverse U edge profile (22) of said first rail part (12) and the corresponding U shaped profile (30) of said second rail part (14), in each instance, engage one another, and where a first contact segment (34) is formed between the shank part (20) of said first rail part (12) and the U shaped edge profile (30) of said second rail part (14), in each instance, whereby said first and said second rail parts (12, 14) rest against one another with linear contact, for reciprocal guidance on one another, free of play, and wherein two second contact segments (38) are formed between the reverse U edge profile (22) of said first rail part (12) and said base part (26) of said second rail part (14) in each instance, wherein said contact segments (34,38) are defined by domed segments (32,36) which run in the longitudinal direction of the rail and which are formed in the center of the shank parts (20) and of the reverse U edge profiles (22) of said first rail part (12).

\* \* \* \* \*